United States Patent
Onggosanusi et al.

(10) Patent No.: US 8,018,903 B2
(45) Date of Patent: *Sep. 13, 2011

(54) CLOSED-LOOP TRANSMIT DIVERSITY SCHEME IN FREQUENCY SELECTIVE MULTIPATH CHANNELS

(75) Inventors: Eko N. Onggosanusi, Dallas, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2322 days.

This patent is subject to a terminal disclaimer.

(21) Appl. No.: 10/301,115

(22) Filed: Nov. 21, 2002

(65) Prior Publication Data

US 2003/0139194 A1    Jul. 24, 2003

Related U.S. Application Data

(60) Provisional application No. 60/331,718, filed on Nov. 21, 2001, provisional application No. 60/339,704, filed on Dec. 13, 2001, provisional application No. 60/343,424, filed on Dec. 20, 2001.

(51) Int. Cl.
*H04W 4/00*    (2009.01)

(52) U.S. Cl. ....... 370/334; 370/208; 370/210; 455/63.1; 455/101; 455/561; 455/562.1

(58) Field of Classification Search ...... 710/2; 375/267, 375/147, 148; 370/210
See application file for complete search history.

(56) References Cited

U.S. PATENT DOCUMENTS

| | | | |
|---|---|---|---|
| 6,331,975 B1 * | 12/2001 | Hosur et al. ................... | 370/342 |
| 6,519,464 B1 * | 2/2003 | Santhoff et al. ............. | 455/456.5 |
| 6,529,545 B2 * | 3/2003 | Tiirola et al. .................. | 375/148 |
| 6,853,839 B2 * | 2/2005 | Usuda et al. ................ | 455/276.1 |
| 2002/0006168 A1 * | 1/2002 | Lee et al. ....................... | 375/267 |
| 2003/0031234 A1 * | 2/2003 | Smee et al. .................... | 375/147 |
| 2003/0112852 A1 * | 6/2003 | Kondo ............................ | 375/141 |
| 2006/0291582 A1 * | 12/2006 | Walton et al. ................. | 375/267 |

* cited by examiner

*Primary Examiner* — Donald L Mills
(74) *Attorney, Agent, or Firm* — Ronald O. Neerings; Wade James Brady, III; Frederick J. Telecky, Jr.

(57) ABSTRACT

Closed loop multiple-antenna wireless communications system with antenna weights determined by maximizing a composite channel signal-to-interference-plus-noise ratio minimum. Multiplexed symbol streams over subsets of antennas enhance throughput.

22 Claims, 13 Drawing Sheets

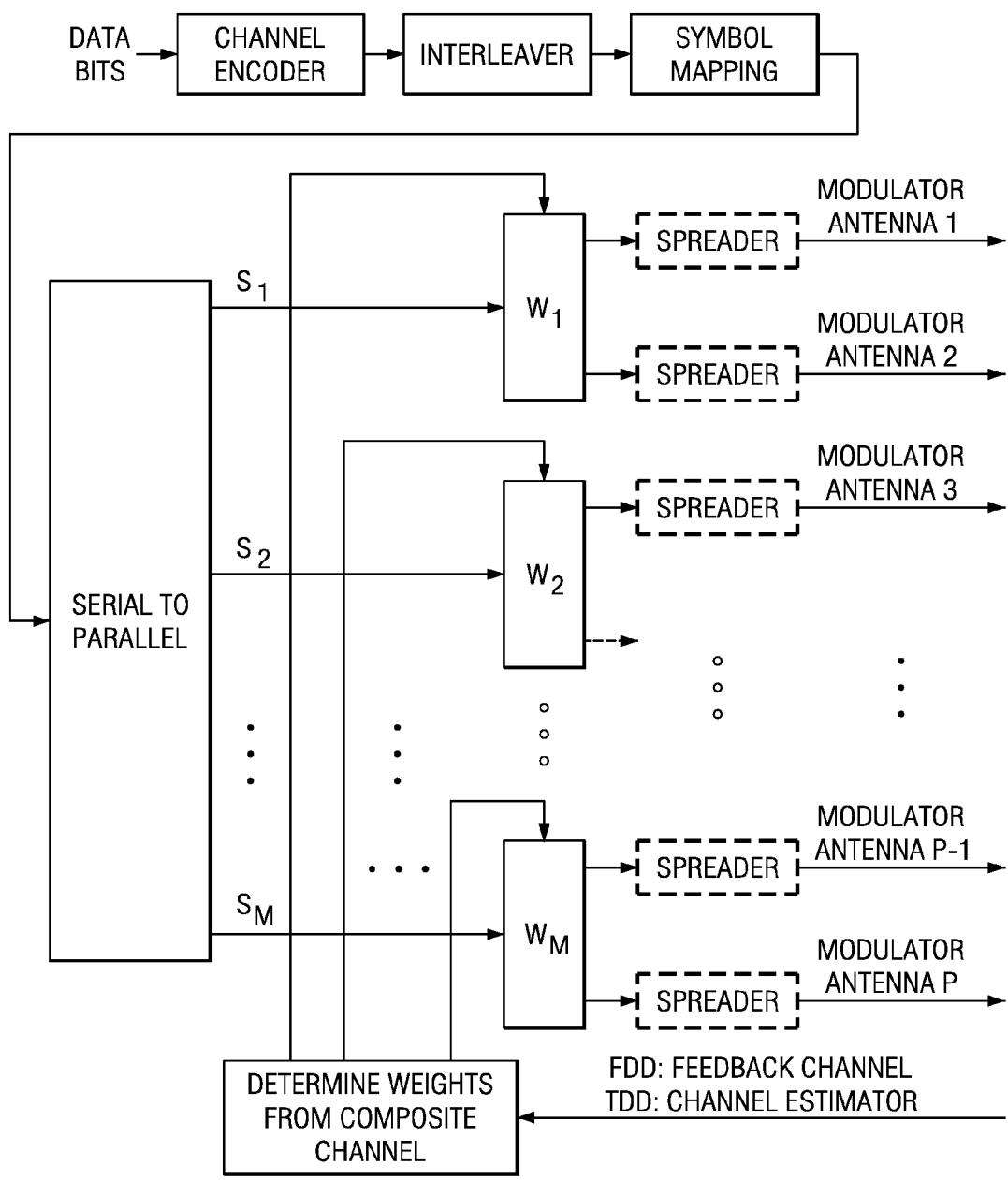

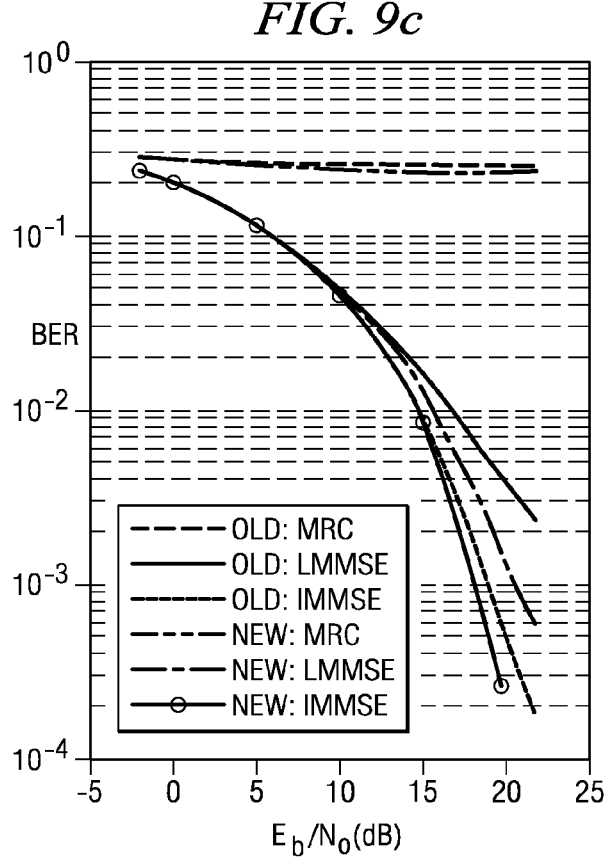

CLOSED-LOOP TRANSMIT DIVERSITY SCHEME IN FREQUENCY SELECTIVE MULTIPATH CHANNELS

CROSS-REFERENCE TO RELATED APPLICATIONS

This application claims priority from US provisional patent application Appl. Nos. 60/331,718, filed Nov. 21, 2001, 60/339,704, filed Dec. 13, 2001, and 60/343,424, filed Dec. 20, 2001. The following copending application discloses related subject matter and has a common assignee: application Ser. No. 10/301,364 (TI-33761), filed Nov. 21, 2002.

BACKGROUND OF THE INVENTION

The present invention relates to wireless digital communications, and more particularly to space diversity transmission systems and methods.

Wireless communication systems include a large variety of approaches, such as frequency division multiple access (FDMA), time division multiple access (TDMA), code division multiple access (CDMA), and combinations. FDMA uses separate frequency bands for duplex communication; whereas, TDMA partitions a single frequency band into time slots which as allocated to one or the other end of a communication link. CDMA uses a spread spectrum approach.

Spread spectrum wireless communications utilize a radio frequency bandwidth greater than the minimum bandwidth required for the transmitted data rate, but many users may simultaneously occupy the bandwidth. Each of the users has a pseudo-random code for "spreading" information to encode it and for "despreading" (by correlation) received spread spectrum signals and recovery of information. Such multiple access typically appears under the name of code division multiple access (CDMA). The pseudo-random code may be an orthogonal (Walsh) code, a pseudo-noise (PN) code, a Gold code, or combinations (modulo-2 additions) of such codes. After despreading the received signal at the correct time instant, the user recovers the corresponding information while other users' interfering signals appear noise-like. For example, the interim standard IS-95 for such CDMA communications employs channels of 1.25 MHz bandwidth and a pseudo-random code pulse (chip) interval $T_C$ of 0.8138 microsecond with a transmitted symbol (bit) lasting 64 chips. The recent 3GPP wideband CDMA (WCDMA) proposal employs a 3.84 MHz bandwidth and the CDMA code length applied to each information symbol may vary from 4 chips to 256 chips. Indeed, UMTS (universal mobile telecommunications system) approach UTRA (UMTS terrestrial radio access) provides a spread spectrum cellular air interface with both FDD (frequency division duplex) and TDD (time division duplex) modes of operation. UTRA currently employs 10 ms duration frames partitioned into 15 time slots with each time slot consisting of 2560 chips ($T_C$=0.26 microsecond).

The air interface leads to multipath reception, so a RAKE receiver has individual demodulators (fingers) tracking separate paths and combines the finger results to improve signal-to-noise ratio (SNR). The combining may use a method such as the maximal ratio combining (MRC) in which the individual detected signals in the fingers are synchronized and weighted according to their signal strengths or SNRs and summed to provide the decoding. That is, a RAKE receiver typically has a number of DLL or TDL code tracking loops together with control circuitry for assigning tracking units to the strongest received paths. Also, an antenna array could be used for directionality by phasing the combined signals from the antennas.

Further, UTRA allows for transmit diversity, both open-loop and closed-loop (receiver feedback). The open-loop transmit diversity includes both time-switched transmit diversity (TSTD) and space-time block-coding-based transmit diversity (STTD). Closed loop techniques provide some significant gain over open-loop transmit diversity techniques by using channel state information (CSI) at the transmitter. For FDD the CSI can be made available at the transmitter via a feedback channel; whereas, for TDD the channel can be directly measured at the transmitter by exploiting the reciprocity (uplink and downlink using the same channel).

FIG. 2d illustrates a generic closed-loop diversity transmitter with P antennas; the feedback channel information determines the weightings among the transmit antennas based on SNRs. With FDD the receiver determines the weightings and signals the transmitter. The spreading blocks of FIG. 2d apply for CDMA systems.

For CDMA with large spreading factors (e.g., 256), the channel delay profile is very small compared to one symbol period. This allows a system to exploit multipath diversity without having to suffer from multipath interference (ISI and MUI). FIG. 3c illustrates a receiver for this situation in which the weightings derive from maximizing the received SNR based on the maximal ratio combining (MRC) or Rake receiver. Note that this received SNR metric neglects the effect of multipath interference, i.e., a Rake receiver successfully separates multiple copies of the signal that arrive at different times.

However, high data rate CDMA schemes, such as HSDPA and 1xEV-DV, use a small spreading factor (e.g., 16) and consequent small symbol period. Hence, multipath interference is not negligible and such high data rate schemes demand equalization or interference cancellation which disrupts multi-antenna weighting determinations. As a result, the weight vector selection based on MRC or Rake receiver is sub-optimal since such criterion assumes perfect multipath interference suppression.

SUMMARY OF THE INVENTION (TI-33760) The present invention provides multi-antenna transmit weighting adapted to a composite channel of physical channel plus equalization and/or interference cancellation.

This has the advantages including increased performance for wireless communications.

BRIEF DESCRIPTION OF THE DRAWINGS

The drawings are heuristic for clarity.
FIGS. 2a-2d illustrate transmitters.

DESCRIPTION OF THE PREFERRED EMBODIMENTS

1. Overview

The preferred embodiment methods determine antenna weightings in closed-loop multi-antenna systems by incorporating the effect of multipath interference as well as the detection scheme used at the receiver for closed-loop transmit diversity weight vector selection. An example of such selection criterion is to maximize minimum signal-to-interference-plus-noise ratio (SINR) of the composite channel (physical channel plus equalization/interference cancellation), where SINR is defined as the ratio between the average power of the desired signal component and the average power of interference plus noise.

Figure 1A:
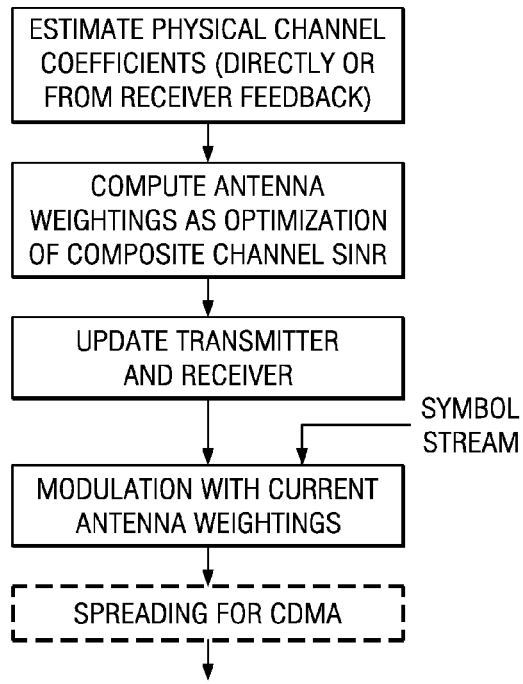
FIGS. 1a-1b are flow diagrams.
Figure 1B:
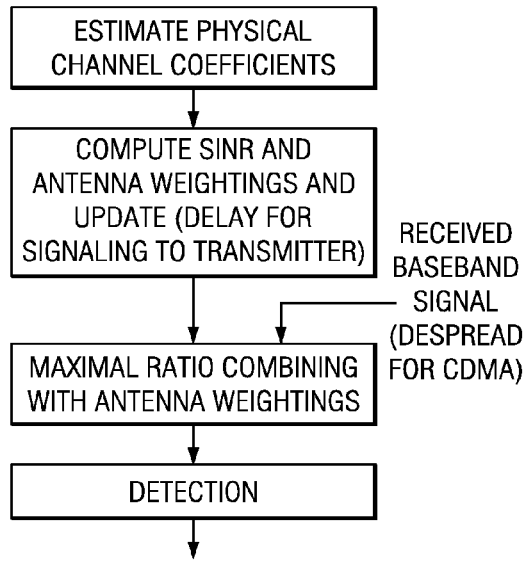

Preferred embodiment transmissions and reception use such antenna weightings with adaptive updating and may include multi-input multi-output (MIMO) systems; see FIGS. 1a-1b flow diagrams. These methods apply to the various wireless communications approaches (CDMA, TDMA, etc.), and extend to multiplexed data stream versions. For a TDD system the transmitter is also a receiver over the same physical channel and thus can directly estimate the channel; whereas, in an FDD system the receiver must provide channel state information to the transmitter.

The determination of antenna weightings derives from optimization of SINR of the composite channel, and thus depends upon the detection method. The detection can be by any convenient method such as maximum likelihood, linear zero-forcing, iterative zero-forcing, linear minimum mean square error, iterative minimum mean square error, and so forth.

For a FDD system the receiver must signal the transmitter. Thus with an FDD CDMA cellular system having mobiles with multiple antennas the antenna weighting signaling with be both uplink and downlink.

Figure 2A:
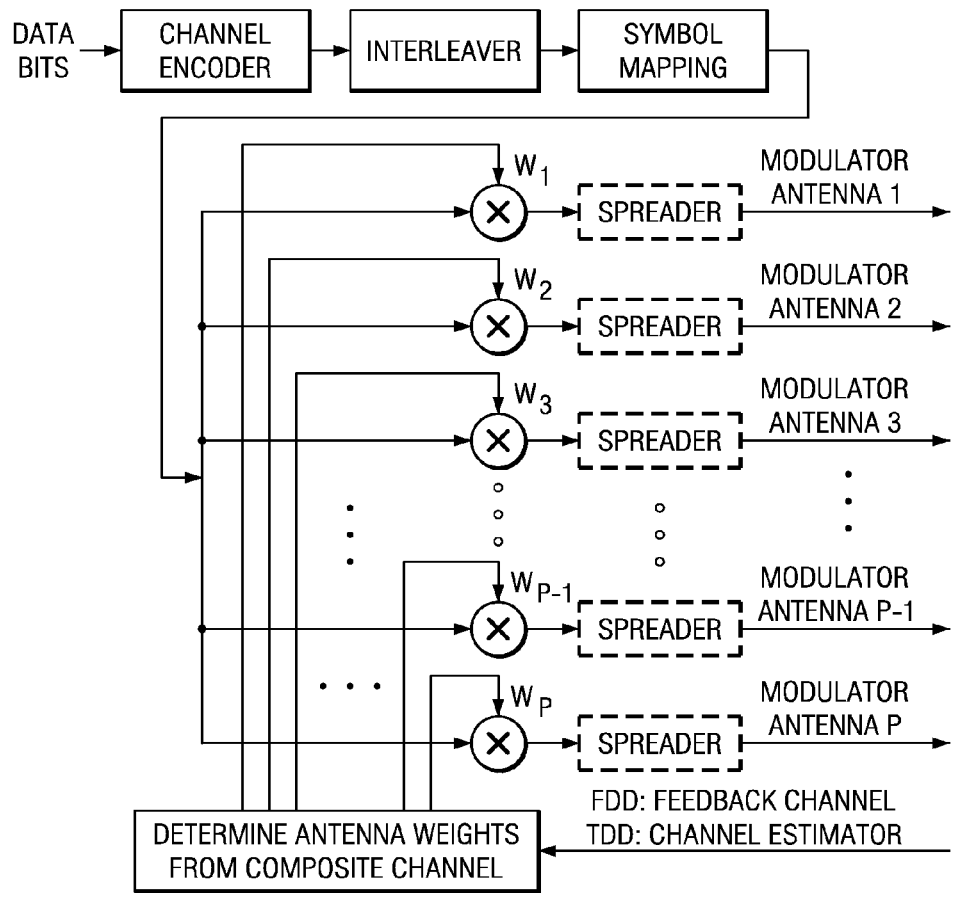
Figure 2C:
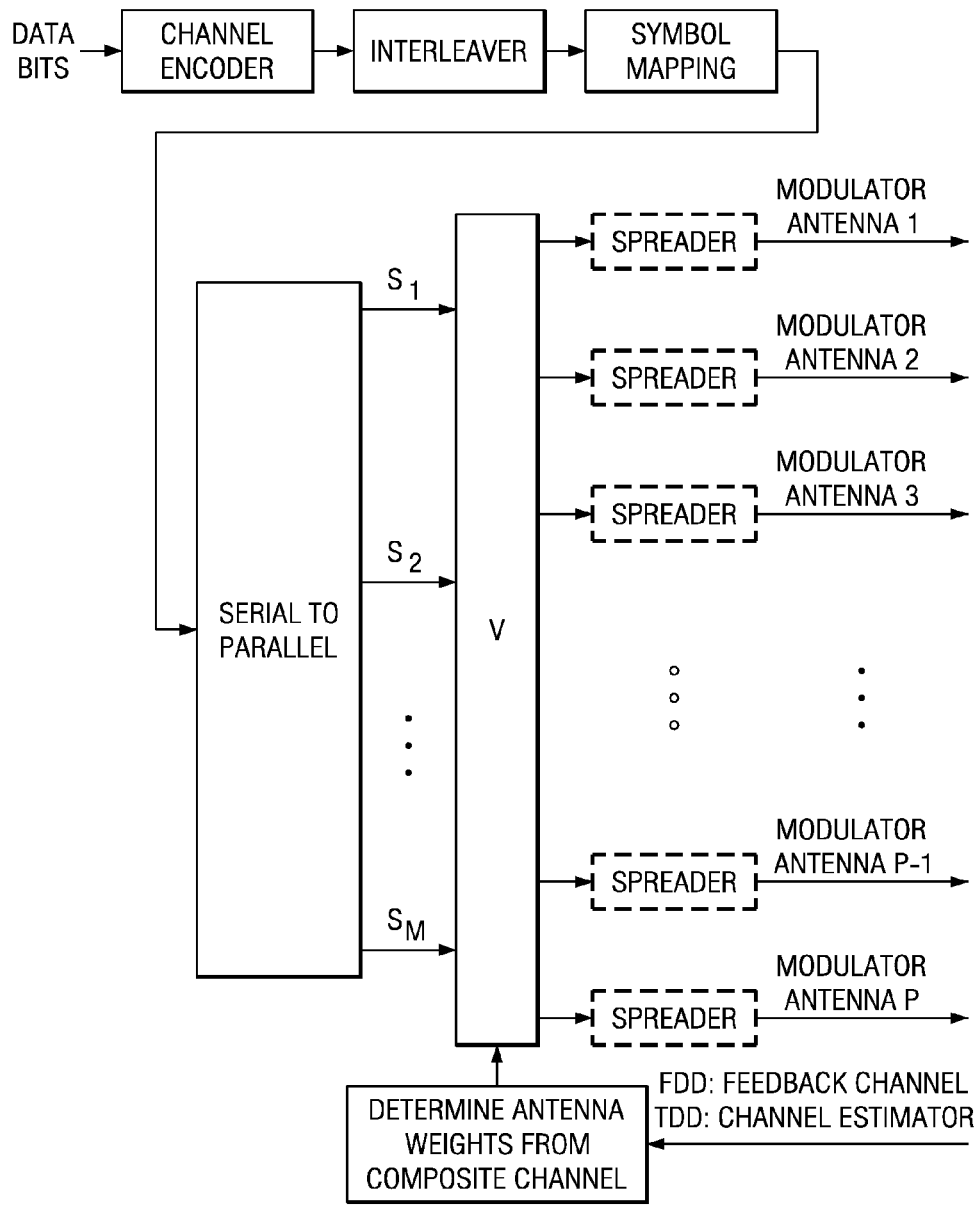
Figure 3A:
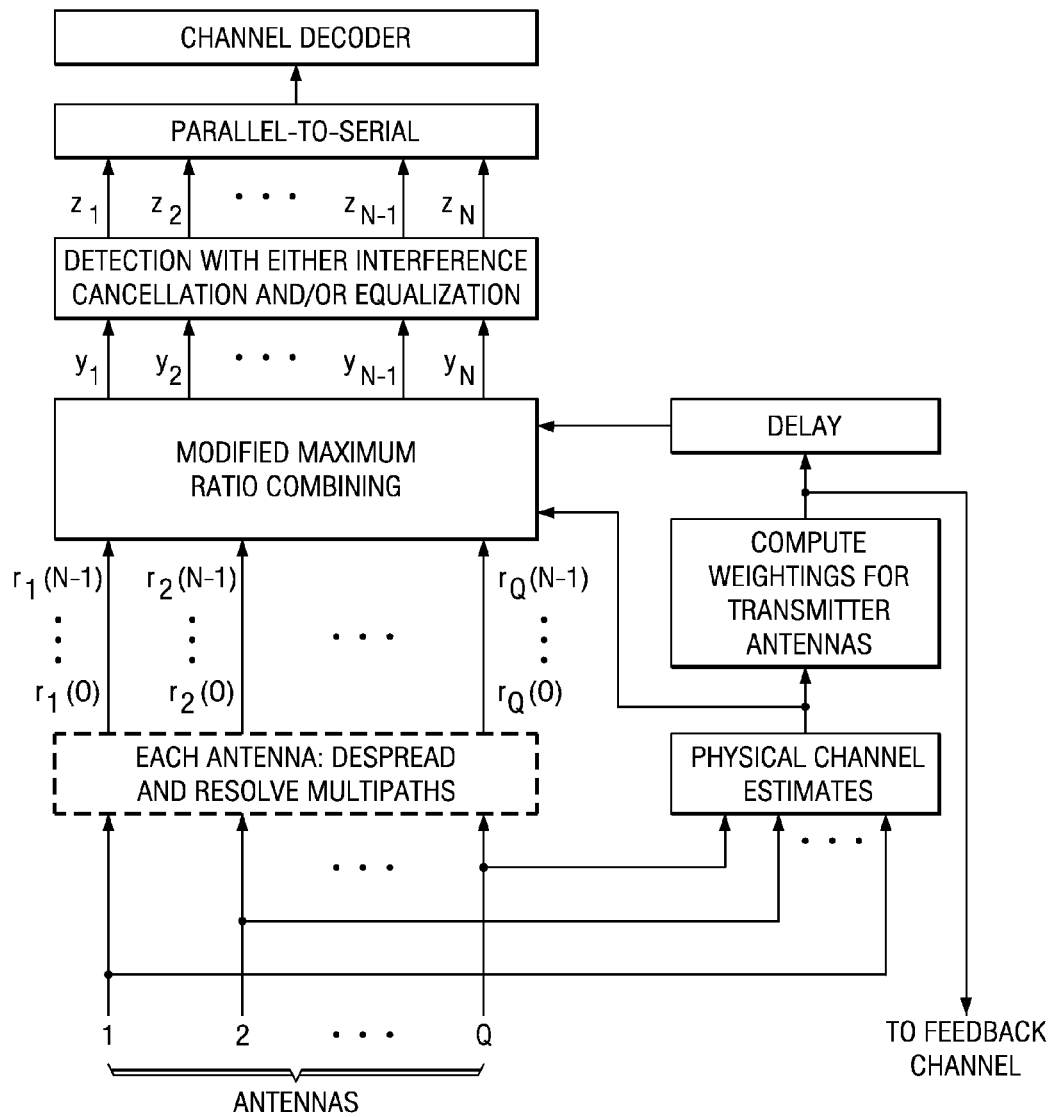
FIGS. 3a-3c show receivers.
Figure 3B:
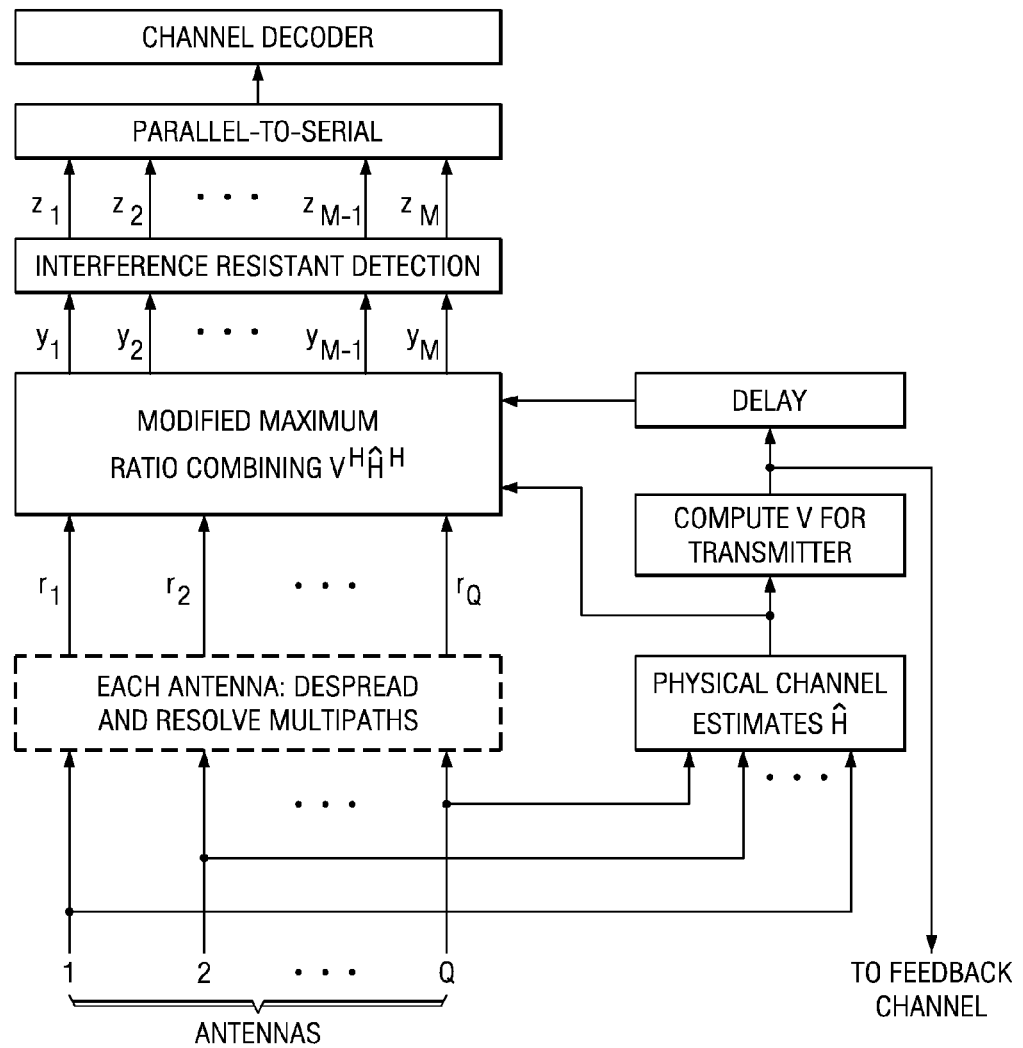

Preferred embodiment communications systems use preferred embodiment encoding and decoding methods. FIGS. 2a-2c illustrate preferred embodiment transmitter functional blocks, and FIGS. 3a-3b show preferred embodiment receiver functional blocks.

In preferred embodiment cellular wireless communications systems base stations and mobile users could each include one or more digital signal processors (DSPs) and/or other programmable devices with stored programs for performance of the signal processing of the preferred embodiment methods. Alternatively, specialized circuitry could be used. The base stations and mobile users may also contain analog integrated circuits for amplification of inputs to or outputs from antennas and conversion between analog and digital; and these analog and processor circuits may be integrated as a system on a chip (SoC). The stored programs may, for example, be in ROM or flash EEPROM integrated with the processor or external. The antennas may be parts of receivers with multiple finger RAKE detectors for each user's signals. Exemplary DSP cores could be in the TMS320C6xxx or TMS320C5xxx families from Texas Instruments.

2. TDMA-Based Single Stream Preferred Embodiments

The single-stream preferred embodiments consider transmission of a single stream of symbols, . . . , s(n), s(n+1), s(n+2), . . . , from P antennas (P≧2) with antenna weights $w_1$, $w_2$, . . . , $w_P$ and reception by Q antennas (Q≧1) with maximal ratio combining (MRC) of multipaths followed by various detection methods. Each detection method leads to a specific method for determination of transmission antenna weightings.

Figure 2D:
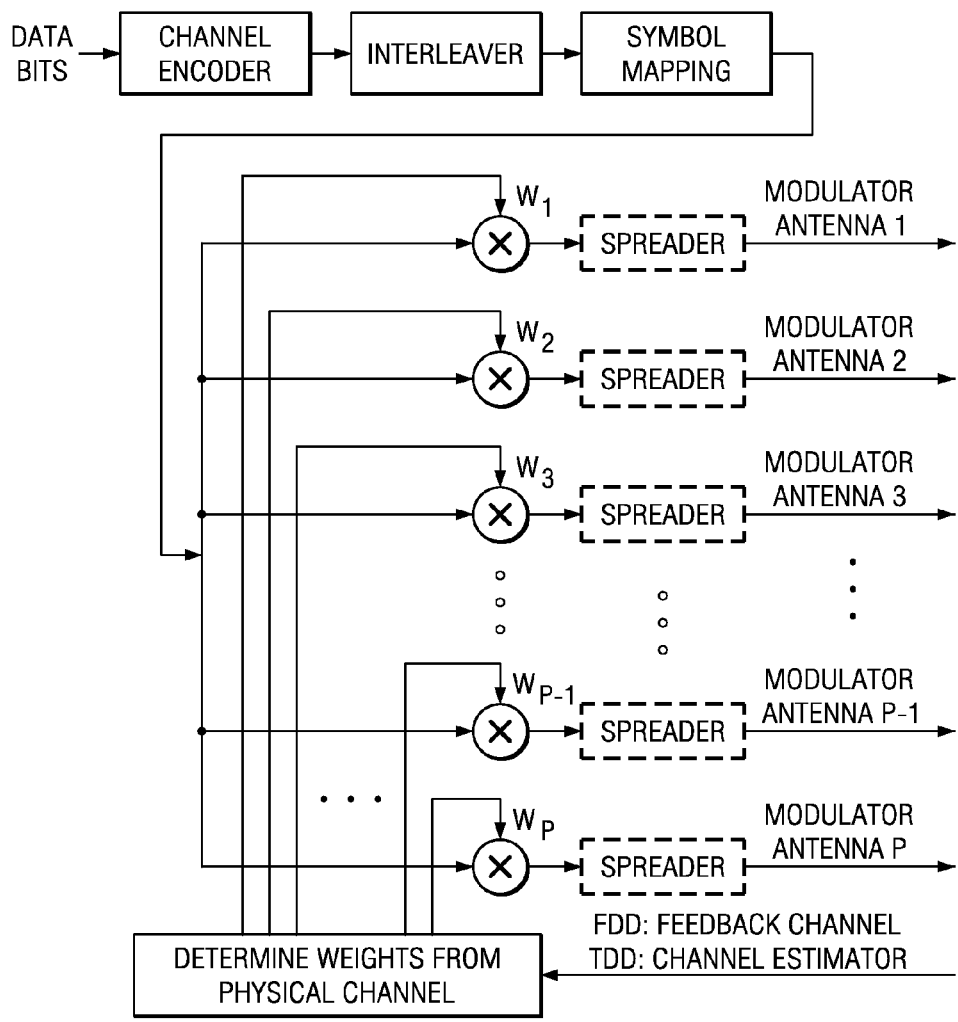
Figure 3C:
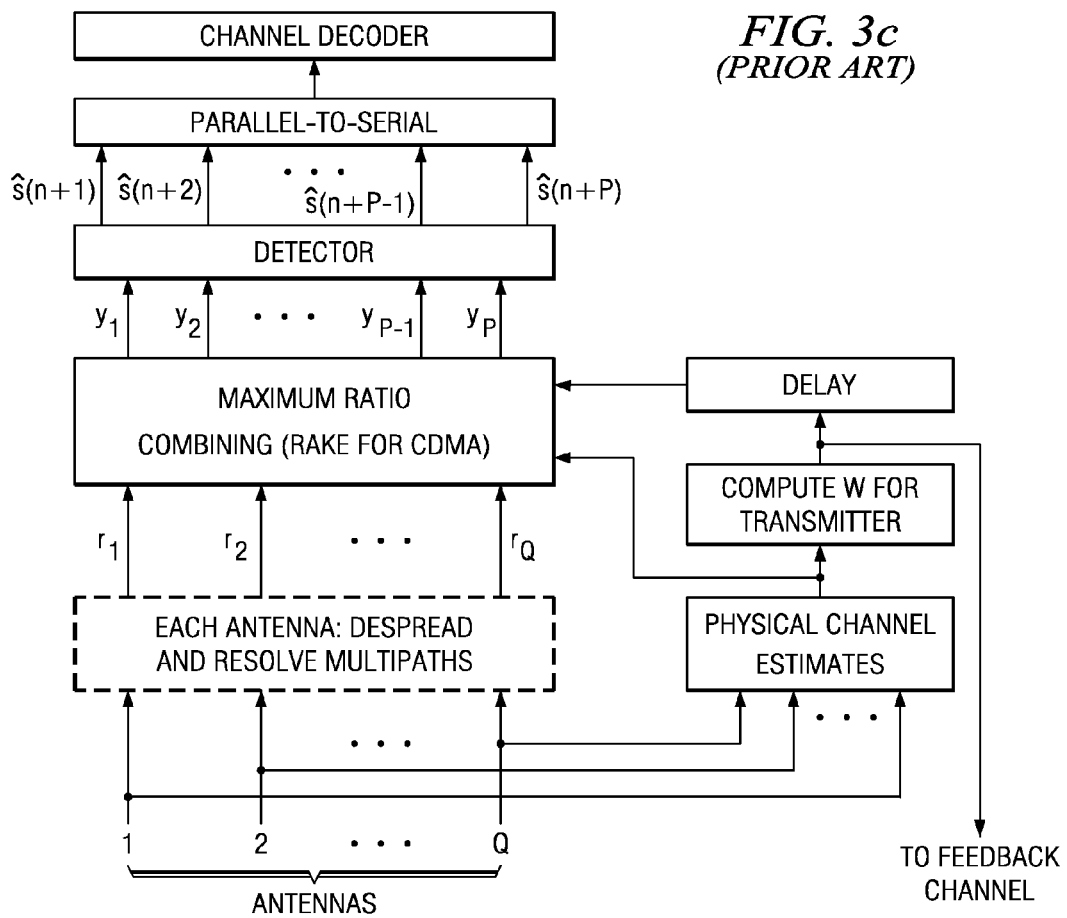

For comparison purposes, first look at the simple case with negligible intersymbol interference. Presume that the channel from P transmit antennas (FIG. 2d) to Q receiver antennas (FIG. 3c) has at most L resolvable paths (L-tap delay line channel model) and that the Q×P channel matrix $H_j$ of attenuations and phase shifts corresponds to the jth delay line tap.

With negligible intersymbol interference and a maximal ratio combining (MRC) receiver, the P antenna weightings $w_1$, $w_2$, . . . , $w_P$ applied to the symbol stream for transmission over the P antennas are taken to maximize the reception:

$$w = \arg\max_{u \in S} u^H (\Sigma_{1 \leq j \leq L} H_j^H H_j) u$$

where S denotes the set of all allowable weighting vectors, and u denotes a P-vector of antenna weightings $u_1, u_2, \ldots, u_P$ in S. For example, S could be the set of P-vectors u with complex components and $\|u\|=1$; in this case, w equals the eigenvector of the P×P matrix $(\Sigma_{1 \leq j \leq L} H_j^H H_j)$ having the maximum eigenvalue. Whereas, S is a finite set of complex P-vectors with unit norm for FDD CDMA.

In contrast, the first preferred embodiments presume equalization in the receiver and use channel state information (CSI) for the composite channel (physical channel plus equalizer) to determine the P antenna weightings. FIGS. 2a,3a show a transmitter and receiver for a system with preferred embodiment antenna weighting determinations which adapt to the channel conditions; the "delay" function in the receiver allows time for the transmitter to adjust to antenna weightings as determined by the receiver and signalled to the transmitter. The (q,p)th element of $H_j$ is the channel from the pth transmit antenna to the qth receive antenna for the jth delay or multipath. Let . . . , s(n), s(n+1), s(n+2), . . . denote the stream of transmitted symbols.

First, for a TDMA system the received baseband discrete-time signal (sampled at the symbol rate, extension to sampling at sub-symbol rate is straightforward) is:

$$r(n) = \begin{bmatrix} r_1(n) \\ r_2(n) \\ \ldots \\ r_Q(n) \end{bmatrix} = \sum_{0 \leq j \leq L-1} H_j w s(n-j) + \text{noise}(n)$$

where w is the P-vector of weights used at the transmitter and the L taps are relabeled $0 \leq j \leq L-1$ to coincide with the corresponding delay. (Code-division differs from the foregoing time-division in that despreading in code-division allows direct tracking of multipaths and replacement of the tapped delay line of time-division with a receiver having multiple tracking units.)

Collect a sequence of N received samples to form one detection window:

$$r = \begin{bmatrix} r(0) \\ r(1) \\ \ldots \\ r(N-1) \end{bmatrix} = H(I_N \otimes w)s + \text{noise}$$

where $$H = \begin{bmatrix} H_0 & 0 & 0 & \cdots & 0 & 0 & \cdots & 0 \\ H_1 & H_0 & 0 & \cdots & 0 & 0 & \cdots & 0 \\ H_2 & H_1 & H_0 & \cdots & 0 & 0 & \cdots & 0 \\ \vdots & \vdots & \vdots & \ddots & \vdots & \vdots & & \vdots \\ H_{L-1} & H_{L-2} & H_{L-3} & \cdots & H_0 & 0 & \cdots & 0 \\ 0 & H_{L-1} & H_{L-2} & \cdots & H_1 & H_0 & \cdots & 0 \\ \vdots & \vdots & \vdots & & & & \ddots & \\ 0 & 0 & 0 & \cdots & H_{N-L} & H_{N-L-1} & \cdots & H_0 \end{bmatrix}$$

$$I_N \otimes w = \begin{bmatrix} w & 0 & 0 & \cdots & 0 \\ 0 & w & 0 & \cdots & 0 \\ 0 & 0 & w & \cdots & 0 \\ \cdots & & & \ddots & \\ 0 & 0 & 0 & \cdots & w \end{bmatrix}$$

Thus r is an NQ-vector, H is an NQ×NP block Toeplitz channel matrix, $(I_N \otimes w)$ is an NP×N matrix, and s is the N-vector of transmitted symbols of the detection window: s(0), s(1), ..., s(N−1). N is presumed larger than L so the lower left N−L triangle of H is all Q×P 0s. Indeed, practical systems may use values such as N=16 or 32 and L=6 Also, presume within a detection window the channel state information (CSI) is constant (not updated) and thus also the weights w are constant within the detection window.

Application of a matched filter (including maximal ratio combining of the tap delays) yields the N×1 output y:

$$y = (I_N \otimes w^H) H^H r$$

More explicitly, (for n<N−L):

$$y(n) = w^H H_0^H r(n) + w^H H_1^H r(n+1) + \ldots + w^H H_{L-1}^H r(n+L-1) = w^H \{ (\Sigma_{0 \leq j \leq L-1} H_j^H r(n+j) ) \}$$

Then in terms of the block of transmitted symbols, s, the output is:

$$y = (I_N \otimes w^H) H^H [H(I_N \otimes w) s + \text{noise}] = (I_N \otimes w^H) H^H H(I_N \otimes w) s + (I_N \otimes w^H) H^H \text{noise}$$

Next, we consider various detection methods. Different types of detection methods can be used at the receiver, such as the simple maximum ratio combining (MRC) receiver above. However, this type of receiver is not resistant to multipath interference. Some examples of interference-resistant detection method include the optimal maximum likelihood detection, linear detection (zero forcing or minimum mean square error), and iterative detection (zero forcing or minimum mean square error). The details of each detection method are given below.

The weight vector w is selected based on a criterion that takes into account the effect of multipath interference. There are a number of possible criteria that can be used, including the Rake-based criterion mentioned in Section 1 (which does not fully account for the effect of multipath interference). An example criterion that includes the effect of multipath interference is to select w such that the off-diagonal elements of matrix $(I_N \otimes w^H) H^H H (I_N \otimes w)$ are minimized in some sense (e.g. minimize the sum of off-diagonal terms, minimize the off-diagonal term with maximum magnitude). Notice that this criterion does not depend on the receiver type. Different types of receiver, however, respond differently to multipath interference. Hence, intuitively, the selection criteria that take into account the receiver type (detection method) result in better performance. Such receiver-specific selection criteria will be discussed in the following paragraphs.

In general, the optimal maximum likelihood detection would estimate the transmitted symbols s by ŝ which is the vector of symbols that minimizes the sum of the errors in the received signal on the receiver antennas. That is, $$\hat{s} = \arg\min_s \| r - H(I_N \otimes w) s \|^2$$

where the minimization is taken over the set of possible transmitted symbol vectors which depends on the symbol mapping. The weight vector (w) selection at the receiver can be performed based on symbol error rate (SER) for maximum likelihood detection (which reflects bit error rate or frame error rate of the system). It can be shown that an upper bound of SER is (assuming noise variance is unity)

$$SER \leq \sum_{z \in \Delta} \kappa_z Q\left( \sqrt{\| H(I_N \otimes w) z \|^2 / 2} \right)$$

where $\Delta = \{(u-v): u,v \in S, u \neq v\}$, S is the set of all possible transmitted symbol vectors, $\kappa_z$ is the multiplicity of z in S, and Q(.) is the Gaussian Q-function. This upper bound can be used for selecting w: choose w that minimizes the SER upper bound. But such a maximum likelihood detection becomes computationally intensive with larger antenna systems. Both linear and iterative detectors are based on the idea of interference suppression/-cancellation. Possible methods include zero forcing (ZF) and minimum mean square error (MMSE). In the following, the linear MMSE (LMMSE) and iterative MMSE (IMMSE) detectors are explained. A zero-forcing-based detectors (LZF and IZF) can be obtained from MMSE analogs by removing the identity term in the matrix inverse.

Generally, for linear detection use a linear equalizer which transforms the matched filter N-vector window output y into N-vector statistic z=Fy which will estimate transmitted N-vector of symbols s. The N×N matrix F determines the SINR(n) for symbol s(n) in the window, and the minimum SINR(n) determines the overall system error rate (either BER or FER). Consequently, the preferred embodiment methods determine the antenna weightings w to maximize the minimum SINR(n). That is, given equalizer F, pick w so that $$w = \arg\min_{u \in S} \min_{1 \leq n \leq N} SINR(n)$$

where u denotes a P-vector of antenna weightings in the set of allowed weightings S. The dependence of SINR(n) on F and antenna weightings for different detectors is as follows.

For linear zero-forcing (LZF) detection, the N×N equalizer matrix F is found as the inverse of the channel model:

$$F = [G^H G]^{-1}$$

where the NQ×N antenna-weighted channel time-window matrix G is given by:

$$G = H(I_N \otimes w)$$

so $G^H G$ is N×N Hermitian and invertible (a 0 eigenvalue corresponds to either 0 antenna weights, which means no transmission, or a 0 channel, which means no reception). And then SINR(n) is given by:

$$SINR(n)_{LZF} = \rho / [G^H G]^{-1}_{n,n}$$

where $\rho$ is the normalized power per symbol and $[G^H G]^{-1}_{n,n}$ denotes the row n, column n element of the matrix $[G^H G]^{-1}$. Thus the SINRs for the symbols are proportional to the reciprocals of the diagonal elements of the equalizer matrix.

Similarly for linear minimum mean square error (LMMSE) detection the equalizer matrix F is picked so the mean square error (MSE), $E[\| F y - s \|^2]$, is minimized. The (theoretically derived) linear transformation F is given by:

$$F = [\rho^{-1} I_N + G^H G]^{-1}$$

And the resultant SINR(n) is:

$$SINR(n)_{LMMSE} = \rho / [\rho^{-1} I_N + G^H G]^{-1}_{n,n} - 1$$

And for these two linear detectors the preferred embodiment antenna weightings w are computed to maximize the minimum composite channel SINR; namely, $$w_{LZF} = \arg\min_{u \in S} \min_{1 \leq n \leq N} 1/[(I_N \otimes u^H)H^H H(I_N \otimes u)]^{-1}_{n,n}$$

$$w_{LMMSE} = \arg\min_{u \in S} \min_{1 \leq n \leq N} 1/[(I_N + \rho(I_N \otimes u^H)H^H H(I_N \otimes u))]^{-1}_{n,n} - 1$$

And when the channel coefficients, H, are updated, the antenna weightings, w, can updated for both transmission and reception. For example, in a TDMA cellular telephone system the updating may occur every 0.5-ms.

For nonlinear detection, such as iterative (decision-feedback) equalizers, more computations are required than for the corresponding linear detector. The iterative equalizer is implemented in N steps with each step making a decision on one of the N symbols in the window. Each step includes a linear transformation (ZF or MMSE) followed by a hard decision-feedback (across space and time). That is, a resulting linearly transformed statistic z=Fy is essentially a soft estimate of a component of s.

The SINR for iterative equalizers (IZF or IMMSE) can be computed as for the linear equalizers. Of course, the optimization to determine the antenna weightings w has higher complexity. The IMMSE detector is a sequence of N linear MMSE detection stages, where each detection outputs both a hard and a soft estimate of one of the N symbols in the detection block. The hard estimate is used to regenerate the interference from the so-far estimated symbols which is then subtracted from the received signal, and the difference used for the next linear symbol estimation. More explicitly, presume the symbols are to be estimated in numerical order and let $\hat{s}_k$ denote the hard estimate of the kth symbol $S_k$ and let the N-vector $\hat{s}^{(k)}$ denote the vector with components $1, 2, \ldots, k$ equal to $\hat{s}_1, \hat{s}_2, \ldots, \hat{s}_k$, respectively, and with the remaining N-k components all equal to 0. The iteration's nth step will output $\hat{s}^{(n)}$ from an initialization of $\hat{s}^{(0)}=0$. The nth step (nth linear detector) proceeds as follows:

(a) Regenerate the interference created by previously-estimated symbols $s_1, \ldots, s_{n-1}$ using the channel matrix; that is, form $G \hat{s}^{(n-1)}$. Note that only the first n-1 rows of blocks of G are used because the last N-n+1 components of $\hat{s}^{(n-1)}$ equal 0, so a simpler matrix with rows of blocks $n, n+1, \ldots N$ all 0s could be used.

(b) Subtract the regenerated interference of substep (a) from the received signal to have an interference-cancelled signal: $r - G \hat{s}^{(n-1)}$.

(c) Apply the linear equalizer filter F to the matched-filtered (N×NQ matrix $G^H$) interference-cancelled signal from substep (b) to generate a soft output $z^{(n)}$ which estimates the yet-to-be-estimated symbols $s_n, S_{n+1}, \ldots, s_N$. Because the interference cancellation (decision feedback) likely is not perfect, further suppress the interfering symbols by use of a modified linear equalizer filter $F^{(n)}$ which derives from the portion of the channel matrix from sources (antennas) $n, n+1, \ldots, N$. That is, $z^{(n)} = F^{(n)} G^H [r - G \hat{s}^{(n-1)}]$ where the matrix $F^{(n)}$ ignores the portion of the channel relating to the previously-estimated symbols (and analogously G restricted to already estimated symbols and $G^H$ restricted to ignore these channels). The particular form of $F^{(n)}$ depends upon the linear detector type and on assumption about the decision feedback error. In effect, the channel matrix is partitioned into two parts with the part relating to the previously-estimated symbols used to generate the interference estimate plus interference-cancelled signal and with the part relating to the yet-to-be-estimated symbols used for detection of the interference-cancelled signal.

(d) Make a hard decision on the pth component of the soft estimate $z^{(n)}$ to generate the hard estimate $\hat{s}_p$ and update the hard estimate vector $\hat{s}^{(n)}$.

In particular, for assumed error-free decision feedback and IZF detection;

$$F^{(n)} G^H = \begin{bmatrix} 0_{(n-1) \times Q} \\ [A_n^H A_n]^{-1} A_n^H \end{bmatrix}$$

where $A_k$ is the NQ×(N−n+1) matrix of the last N−n+1 columns of blocks of G; that is, $A_n = [g_n \, g_{n+1} \cdots g_N]$ with $g_k$ the kth column (NQ×1) of the NQ×N channel matrix G. Of course, $g_k$ is the channel of the kth symbol from the weighted P antennas to the received NQ-vector. Then the SINR(n) is given by:

$$SINR(n) = \rho / [A_n^H A_n]^{-1}_{1,1}$$

And the antenna weightings follows as before from maximizing the minimum SINR(n).

Analogously for IMMSE in which $$F^{(n)} G^H = \begin{bmatrix} 0_{(n-1) \times Q} \\ [A_n^H A_n + \rho^{-1} I_{N-n+1}]^{-1} A_n^H \end{bmatrix}$$

and the resulting SINR can be written as $$SINR(n) = \rho / [A_n^H A_n + \rho^{-1} I_{N-n+1}]^{-1}_{1,1} - 1$$

Ordered iterative detection based on the symbol post-detection SINR is often used to reduce the effect of decision feedback error. Let the detection order be $\pi(1), \pi(2), \ldots, \pi(N)$ where $\pi()$ is a permutation of the N integers $\{1, 2, \ldots, N\}$; that is, the first estimated symbol (hard estimate output of the first step of the iteration) will be $\hat{s}_{\pi(1)}$ and the corresponding nonzero element of $\hat{s}^{(1)}$. The maximum SINR of the components of the first soft estimate $z^{(1)}$, which estimates all P symbols, determines $\pi(1)$. Similarly, the SINRs of the components of $z^{(2)}$, which estimates all of the symbols except $s_{\pi(1)}$ determines $\pi(2)$, and so forth. The partitioning of the channel matrix at each step is analogous.

Note that the soft estimates $Z_1, Z_2, \ldots, Z_N$ for the transmitted block of symbols $s_1, s_2, \ldots, S_N$ (i.e., the output $z^{(n)}_{\pi(n)}$ from the nth step) are used in a sequence decoder, such as a Viterbi decoder or a Turbo decoder, in the form of log likelihood ratios (LLRs).

Other detection schemes are also possible. For example, a receiver consisting of a channel equalizer (to equalize H instead of G) followed by coherent combining with $(I_N \otimes w)$ can be used. In this case, the operation can be described as follows:

$$z = (I_N \otimes w^H) Fr$$

where $F = [\rho^{-1} I_{NQ} + H^H H]^{-1}$ (LMMSE equalizer) or $F = [H^H H]^{-1}$ (LZF equalizer, which requires Q≧P). In this case, channel equalization is performed to remove the effect of multipath (frequency selectivity). Then, coherent combining with the weight vector is performed in symbol-by-symbol basis. Closed-form expressions of SINR can also be derived from the definition. In practice, such channel equalizer can be implemented as an adaptive filter. Note that this scheme is inferior to the previous equalization scheme as this scheme does not exploit the knowledge of w in equalization. Utilizing w as in the previous scheme enables signal space (P-fold) dimensionality reduction.

3. CDMA-Based Single Stream Preferred Embodiments

A CDMA system can have multiple mobile users for the same downlink transmissions from a base station; the uplink channels for different mobiles users are generally different, but for downlink the users experiences a common channel. For the general case of K users after collecting samples of the received signal at the chip rate, the baseband received signal $NN_CQ$-vector (where $N_C$ is the CDMA spreading factor) can be written as:

$$r = \sum_{1 \leq k \leq K} \sqrt{P_k} H_k(C_k \otimes I_P)(I_N \otimes w_k)s_k + \text{noise}$$

$$= [\sqrt{P_1}H_1(C_1 \otimes I_P)(I_N \otimes w_1), \sqrt{P_2}H_2(C_2 \otimes I_P)(I_N \otimes w_2), \ldots,$$

$$\sqrt{P_K}H_K(C_K \otimes I_P)(I_N \otimes w_K)] \begin{bmatrix} s_1 \\ s_2 \\ \vdots \\ s_K \end{bmatrix} + \text{noise}$$

where K is the number of users, $P_k$ is the power of the kth user, N is the symbol block size, $H_k$ is the $N N_C Q \times N N_C P$ channel matrix of the kth user, $C_k$ is the $N N_C \times N$ CDMA spreading code matrix of the kth user, $w_k$ is the weight vector of user k, and $s_k$ is a block of symbols of user k. In this case multiuser interference cancellation (also known as multiuser detection) is needed. Similar to equalization, linear or iterative interference cancellation (ZF or MMSE) can be used and the SINR can be computed in the same manner as for the time-division case by considering the total multiuser channel matrix $$H_{tot} = [\sqrt{P_1}H_1(C_1 \otimes I_P)(I_N \otimes w_1), \qquad \sqrt{P_2}H_2(C_2 \otimes I_P)$$
$$(I_N \otimes w_2), \ldots, \sqrt{P_K}H_K(C_K \otimes I_P)(I_N \otimes w_K)]$$

so $H_{tot}$ is an $N N_C Q \times NK$ matrix for a Q-antenna receiver. For example, the linear ZF and MMSE multiuser interference cancellation for CDMA are $$z = [z_1^T z_2^T \ldots z_K^T]^T = Fr$$

$$F = [H_{tot}^H H_{tot}]^{-1} H_{tot}^H (LZF), \text{ and}$$

$$F = [H_{tot}^H H_{tot} + \rho^{-1} I_{NKP}]^{-1} H_{tot}^H (LMMSE)$$

The SINR for each symbol from each CDMA user can also be defined in the same manner as that for TDMA. Similarly, iterative detectors for CDMA are analogous to that for CDMA. In practice, linear multiuser interference cancellation can be implemented in successive or parallel architecture.

For downlink applications where the $H_k$ are all the same ($H_k=H$) but $w_k$ is user-specific (multiple users) interference cancellation described above is a good alternative. Another possible receiver scheme for user k consists of a channel equalizer (which linearly equalizes only the channel H), the kth user despreader (multiplication with $C_k^H \otimes I_P$), and symbol-by-symbol coherent combining with the weight vector (multiplication with $(I_N \otimes w_k^H)$). Again, the SINR expression for each symbol from user k can be derived from SINR definition. In this downlink scenario, the weighting vectors for all of the users can be jointly selected at the base station maximizing the minimum SINR across all users and symbols (similar to the previous preferred embodiments for equalizers). This ensures that all of the users experience good performance.

For the downlink applications where both the $H_k$ and the $w_k$ are common (one user with multiple codes: $H_k=H$, $w_k=w$), the above interference cancellation and equalization techniques are applicable. In this single-user multi-code downlink scenario, another receiver scheme can be derived by using the following identity:

$$H(C_k \otimes I_P)(I_N \otimes w) = H(I_{NN_c} \otimes w)C_k = H_{eff}C_k$$

The new receiver consists of an equalizer for the effective channel $H_{eff}=H(I_{NN_c} \otimes w)$ followed by a despreader for user k (multiplication with $C_k^H$). For weight vector selection, only one weighting vector needs to be determined, and maximizing the minimum SINR criteria again is used.

For TDMA- and CDMA-based systems, other types of equalizers and/or interference cancellers can be designed for mitigating the effect of multipath interference when closed-loop transmit diversity is used. For each type of multipath interference-resistant receiver, an expression of SINR as a function of the channel realization, spreading code matrices (for CDMA), and weight vectors can be derived and used for preferred embodiment weight vector selection.

4. Simulation Results

Figure 4:
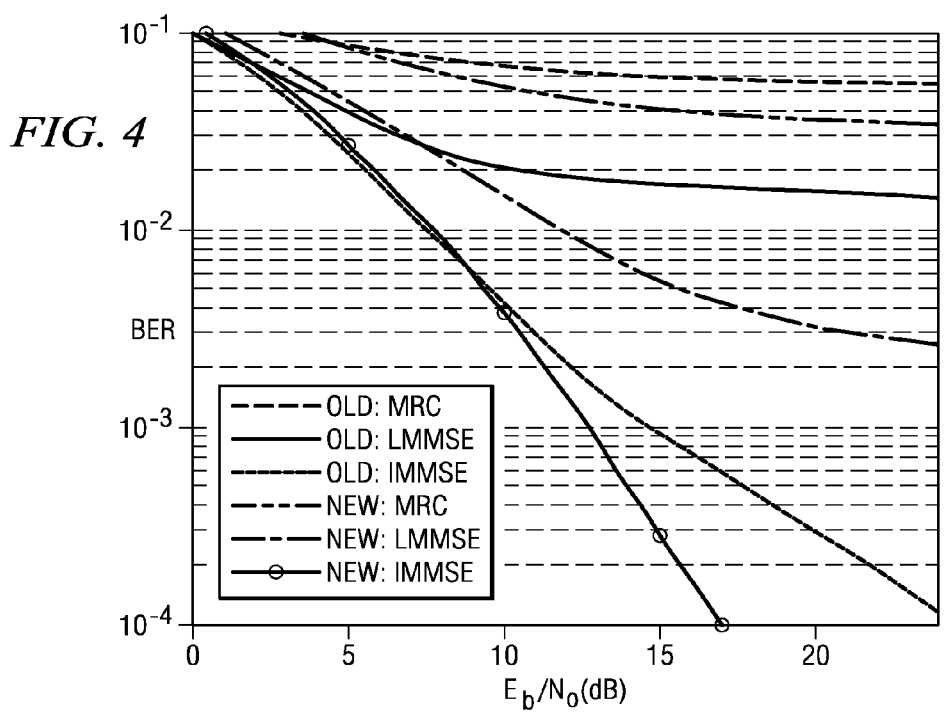
FIGS. 4-9 present simulation results.
Figure 5:
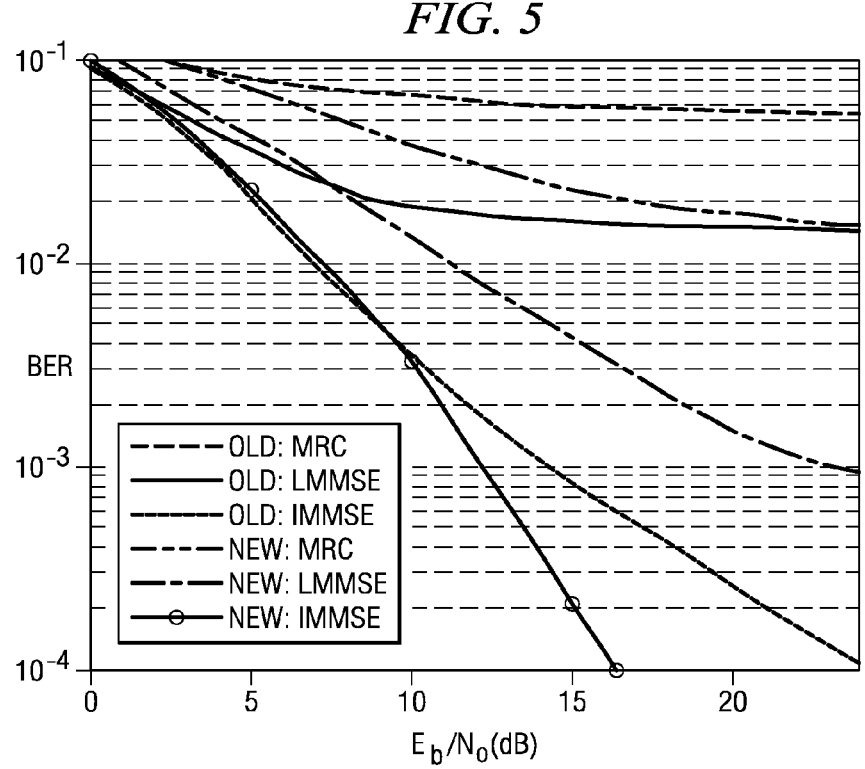
Figure 6:
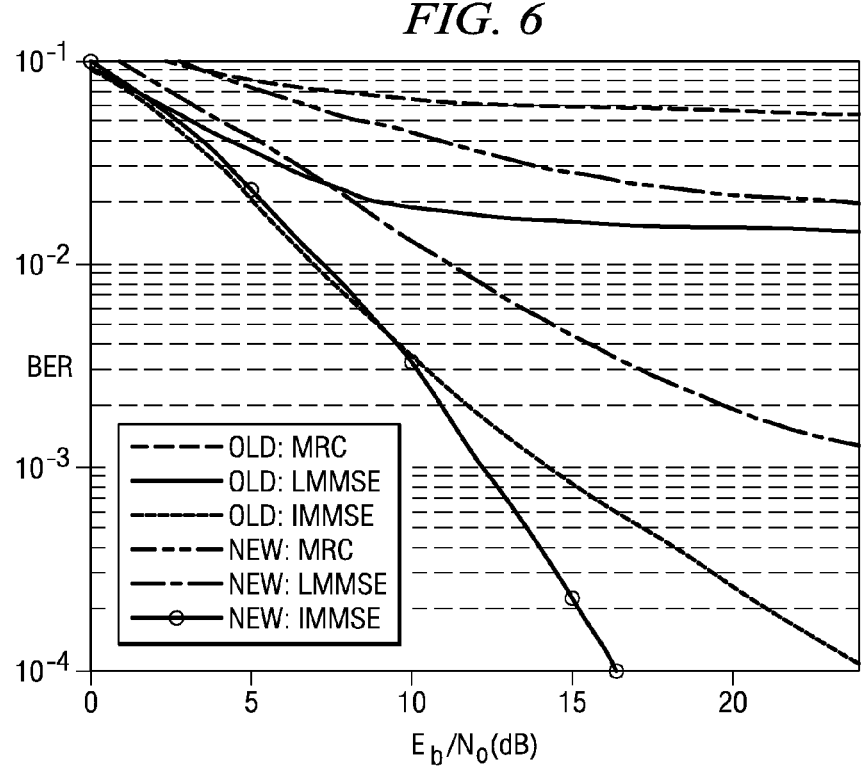

FIGS. 4-6 depict the simulated BER performance of a TDMA system in a 2-tap intersymbol interference channel with mode 1 (2-bit phase), mode 2 (1-bit magnitude and 3-bit phase), and mode 3 (1-bit magnitude and 2-bit phase) weighting vector quantizations. The system used QPSK modulation, maximal ratio combining (MRC) matched filtering, linear and iterative MMSE detection. Observe that large performance gain is obtained form high $E_b/N_0$, which in this case corresponds to the region of interest.

Figure 7A:
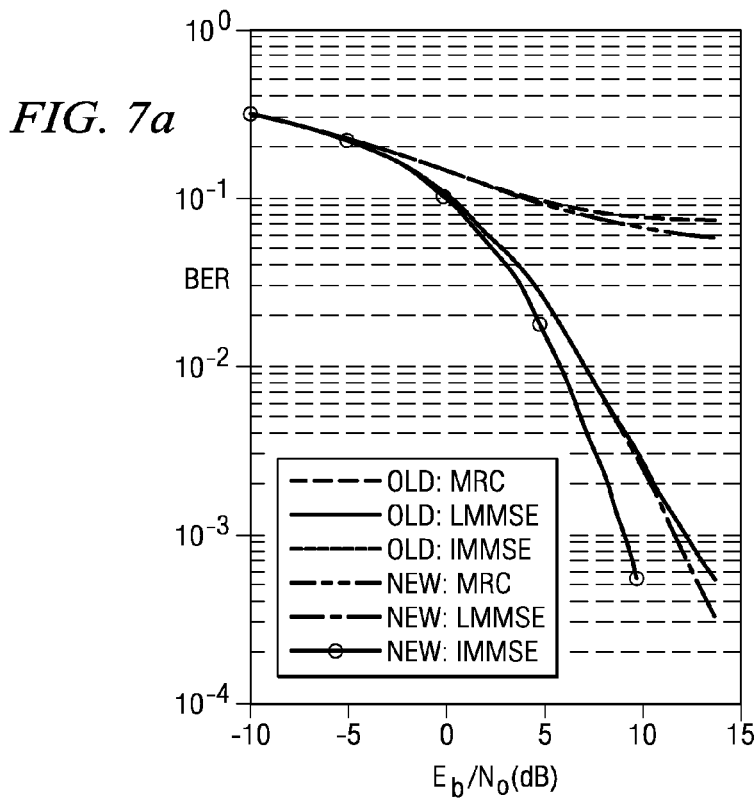
Figure 7B:
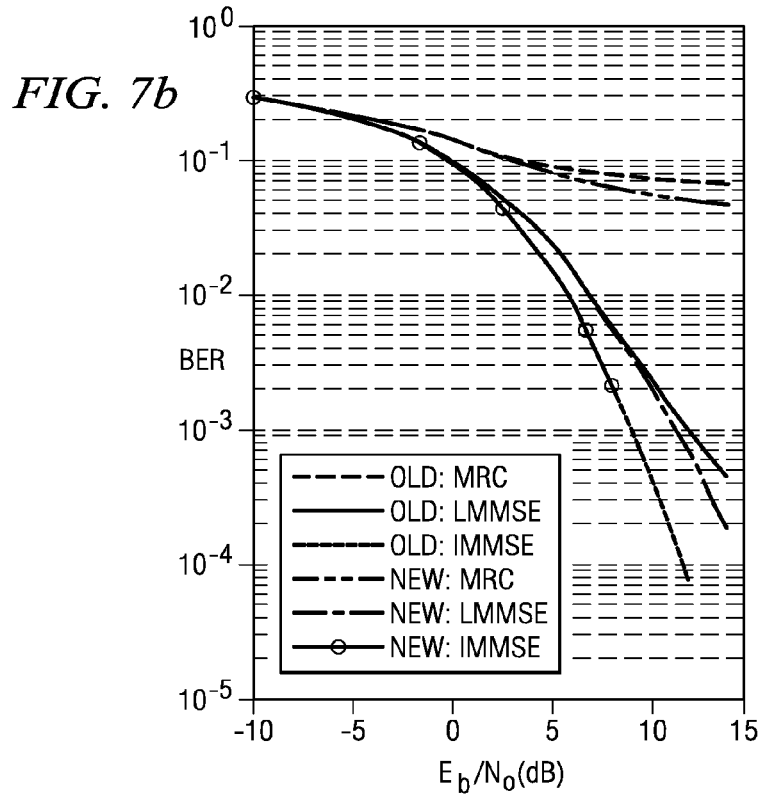
Figure 7C:
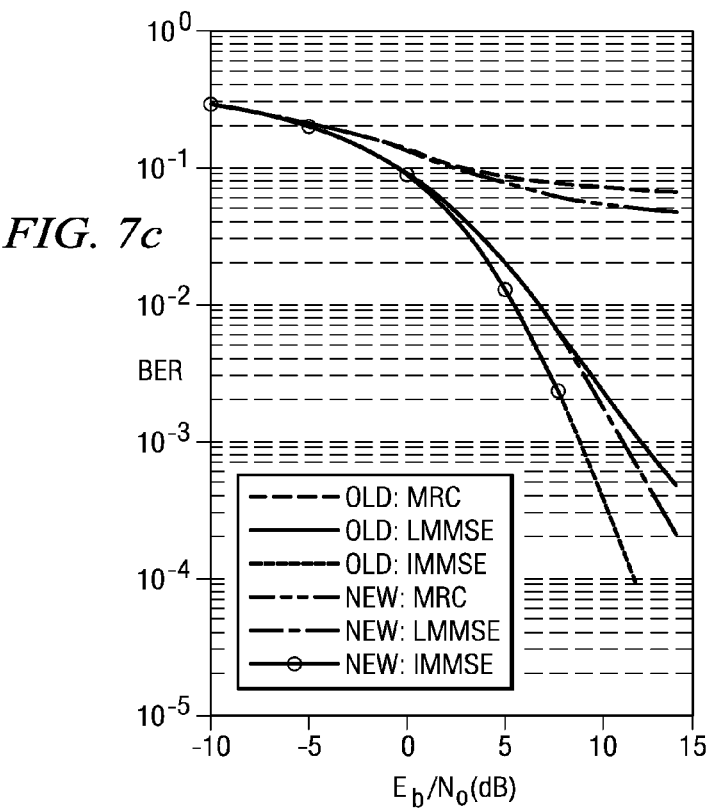
Figure 8A:
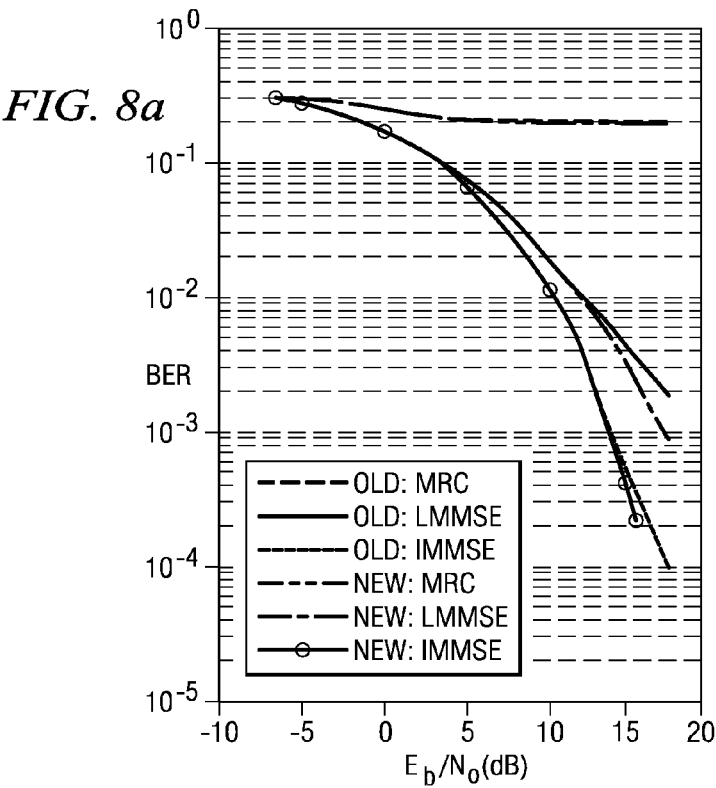
Figure 8B:
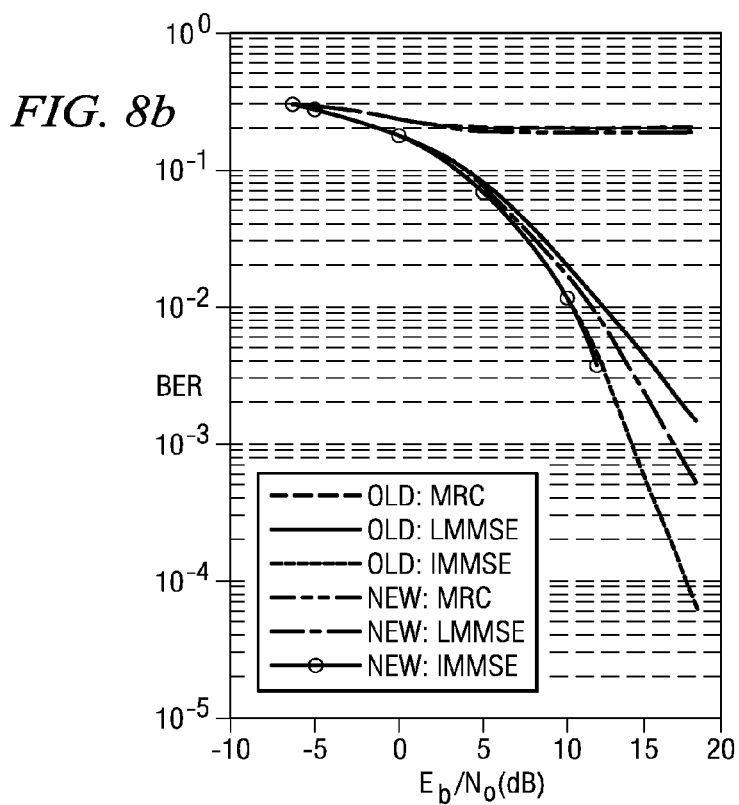
Figure 8C:
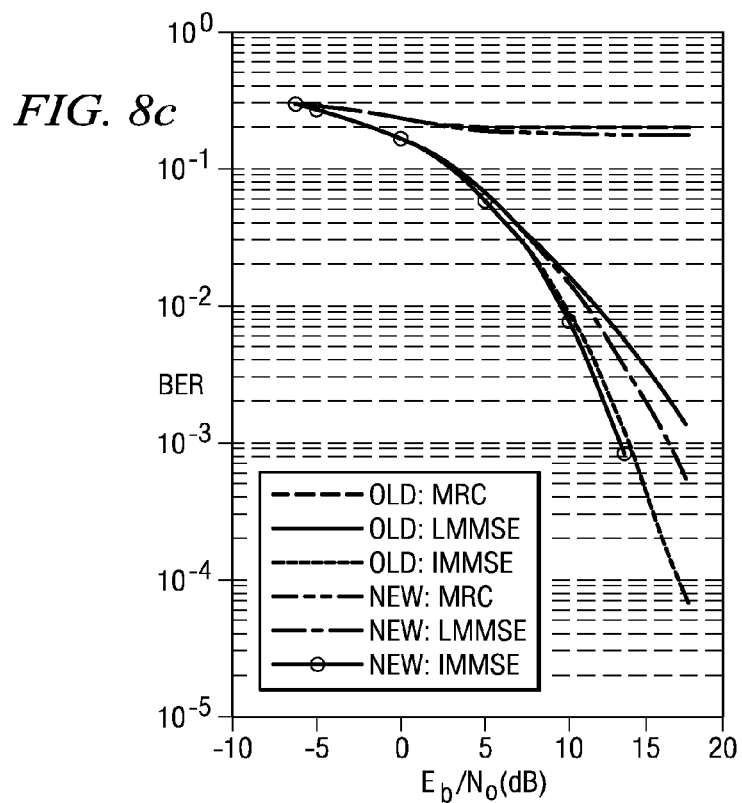
Figure 9A:
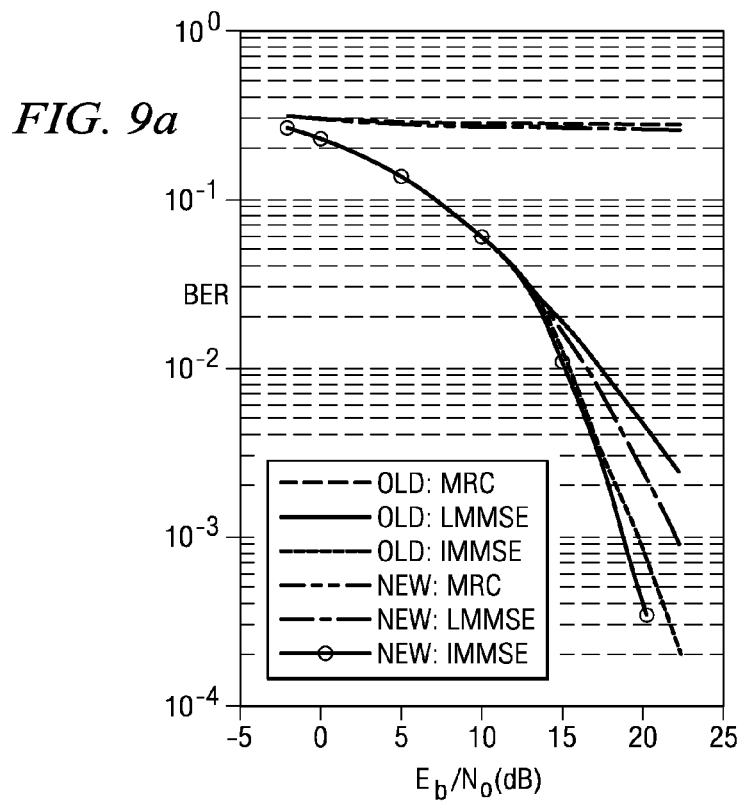
Figure 9B:
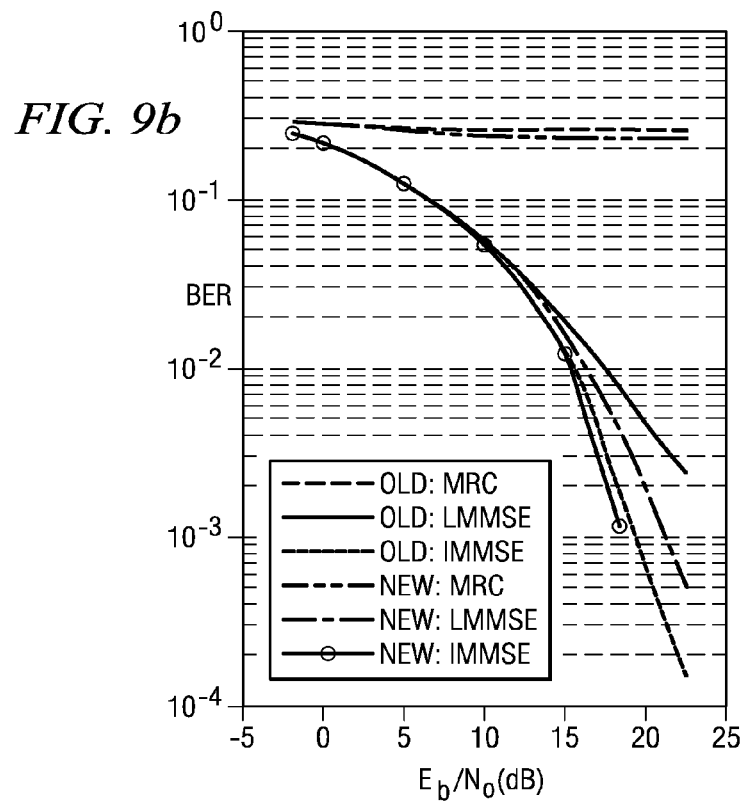

FIGS. 7-9 show simulation results for CDMA with 14 codes (spreading factor of f16) in Pedestrian B channel and QPSK, 16QAM, and 64QAM modulations. Note that the gain for the CDMA system is less dramatic than for the TDMA system. This arises from the TDMA system suffering from channel mulss. The use of spreading code in CDMA systems essentially removes this problem. Hence, the performance gain from using the preferred embodiment eighting selection method is less. However, the gain is still significant, and the gain is more for higher order modulations.

5. Modifications

The preferred embodiments can be modified in various ways while retaining the feature of antenna weightings determined from the composite channel.

For example, as mentioned before, other receiver schemes can be used, which result in different error rate or SINR dependence upon the channel and weight vectors. And the number of multipaths resolved and/or the number of taps used and the symbol block size could all be varied. The number of antennas used, P and Q, could be varied with $Q \geq P$ helping diversity. The antenna weights could be updated periodically or intermittently and with update interval varying up to several frames or adapting to channel conditions.

What is claimed is:

1. A method of transmission, comprising:
   (a) providing P transmit antennas where P is an integer greater than or equal to 2;
   (b) providing weights for said P antennas, said weights determined from information of communication channels from said P antennas to Q receive antennas) where Q is a positive integer, said weights determined to suppress multipath interference at a remote receiver having said Q receive antenna(s); and
   (c) transmitting symbols modified by said weights from said P antennas.

2. The method of claim 1, wherein:
   (a) said weights determined in step (b) of claim 1 includes off-diagonal minimization of elements of a channel matrix premultiplied by its Hermitian conjugate.

3. The method of claim 1, wherein:
(a) said weights determined in step (b) of claim 1 includes information of a detection method to account for said multipath interference.

4. The method of claim 3, wherein:
(a) said weights determined in step (b) of claim 1 includes minimization of an error rate when using said detection method.

5. The method of, claim 4, wherein:
(a) said weights determined includes minimization of symbol error rate for a maximum likelihood detection method.

6. The method of claim 3, wherein:
(a) said weights determined in step (b) of claim 1 includes maximization of a signal-to-interference-plus-noise ratio when using said detection method.

7. The method of claim 6, wherein:
(a) said weights determined in step (b) includes maximization of minimum signal-to-interference-plus-noise ratio for a detection method selected from the group consisting of linear zero-forcing, linear minimum mean square error, iterative zero-forcing, and iterative minimum mean square error.

8. The method of claim 3, wherein:
(a) said providing weights in step (b) includes channel information estimated from reception of signals from said Q antenna(s).

9. The method of claim 1, wherein:
(a) said providing weights in step (b) of claim 1 includes reception of channel information from said Q antenna(s).

10. The method of claim 1, wherein:
(a) said providing weights in step (b) of claim 1 includes reception of said weights from said Q antenna(s).

11. The method of claim 1, wherein:
(a) said communication channel is a wideband or CDMA channel with a single user using multiple codes having the same weights.

12. The method of claim 11, wherein:
(a) said weights determined in step (b) includes information of a detection method to account for said multipath interference; wherein said detection method is multi-code interference cancellation with method selected from the group consisting of linear zero-forcing, linear minimum mean square error, iterative zero-forcing, and iterative minimum mean square error.

13. The method of claim 3, wherein:
(a) said communication channel is a wideband or CDMA channel with multiple users having differing weights; and
(b) said differing weights are from claim 3 by joint maximization.

14. The method of claim 13, wherein:
(a) said weights determined in step (b) includes information of a detection method to account for said multipath interference; wherein said detection method is multiuser interference cancellation with method selected from the group consisting of linear zero-forcing, linear minimum mean square error, iterative zero-forcing, and iterative minimum mean, square error.

15. The method of claim 3, wherein:
(a) said weights of step (b) of claim 1 are updated.

16. The method of claim 1, wherein:
(a) said integer Q is greater than or equal to said integer P.

17. A transmitter, comprising:
(a) P transmit antennas where P is an integer greater than or equal to 2; and
(b) multipliers with weights coupled to said P antennas, said weights determined from (i) information of communication channels from said P antennas to Q receive antenna(s) where Q is a positive integer, said weights determined to suppress multipath interference at a remote receiver having said Q receive antenna(s) and/or (ii) a detection method to suppress multipath interference at said remote receiver.

18. The transmitter of claim 17, wherein:
(a) said weights are determined by a processor coupled to said multipliers.

19. The transmitter of claim 17, wherein:
(a) said weights are determined outside of said transmitter and received by said transmitter from said signals from said Q antenna(s).

20. A receiver, comprising:
(a) Q antenna(s) where Q is a positive integer;
(b) a detector coupled to said Q antenna(s), said detector adapted to detect signals from P transmit antennas where P is an integer greater than or equal to 2 and with weights applied to said P antennas, where said weights are determined from (i) information of, communication channels from said P antennas to Q receive antenna(s), said weights determined to suppress multipath interference at said receiver and/or (ii) a detection method of said detector to suppress multipath interference at said receiver.

21. The receiver of claim 20, wherein:
(a) said detection method is selected from the group consisting of linear zero-forcing, linear minimum mean square error, iterative zero-forcing, and iterative minimum mean square error; and
(b) said weights determination includes maximization, of minimum signal-to-interference-plus-noise ratio.

22. The receiver of claim 20, wherein:
(a) said detection method is maximum likelihood; and
(b) said weights determination includes minimization of symbol error rate.

* * * * *